United States Patent
Kim et al.

(10) Patent No.: US 10,622,877 B2
(45) Date of Patent: Apr. 14, 2020

(54) LINEAR VIBRATION GENERATOR

(71) Applicant: MPLUS CO., LTD., Suwon-si, Gyeonggi-do (KR)

(72) Inventors: Yong Tae Kim, Suwon-si (KR); Nam Sock Kim, Suwon-si (KR); Tae Hoon Lee, Suwon-si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 357 days.

(21) Appl. No.: 15/642,470

(22) Filed: Jul. 6, 2017

(65) Prior Publication Data

US 2018/0019651 A1 Jan. 18, 2018

(30) Foreign Application Priority Data

Jul. 15, 2016 (KR) .......................... 10-2016-0090248

(51) Int. Cl.
| | |
|---|---|
| *H02K 41/02* | (2006.01) |
| *H02K 33/16* | (2006.01) |
| *H02K 11/33* | (2016.01) |
| *H02K 1/12* | (2006.01) |

(52) U.S. Cl.
CPC .............. *H02K 33/16* (2013.01); *H02K 1/12* (2013.01); *H02K 11/33* (2016.01)

(58) Field of Classification Search
CPC ...................................................... H02K 33/16
USPC .................................. 335/252, 234; 310/15
See application file for complete search history.

(56) References Cited

U.S. PATENT DOCUMENTS

| | | | | |
|---|---|---|---|---|
| 6,366,189 B1 * | 4/2002 | Bergvall | ............... | H01F 7/1615 335/229 |
| 6,639,496 B1 * | 10/2003 | van Namen | ............ | E05B 47/00 335/229 |
| 6,777,895 B2 * | 8/2004 | Shimoda | .................. | B06B 1/045 318/114 |
| 7,091,807 B2 * | 8/2006 | Tanimizu | ................ | H01F 7/081 335/220 |
| 7,474,018 B2 * | 1/2009 | Shimizu | ............. | A61C 17/3445 310/12.22 |
| 8,106,546 B2 * | 1/2012 | Yamazaki | .............. | H02K 33/16 310/15 |

(Continued)

FOREIGN PATENT DOCUMENTS

| | | |
|---|---|---|
| KR | 10-1101330 B1 | 12/2011 |
| KR | 10-1142284 | 5/2012 |

OTHER PUBLICATIONS

KIPO Office Action dated Jul. 19, 2017 for Korean Patent Application No. 10-2016-0090248.

*Primary Examiner* — Alexander Talpalatski

(74) *Attorney, Agent, or Firm* — LRK Patent Law Firm

(57) ABSTRACT

A linear vibration generator in which a coil or a stator is fixed using a simple structure compared to a conventional technology. There is provided a linear vibration generator having advantages of a simplified assembly process and a low production cost by reducing the number of parts that form the inside of the vibration generation device through an improved bracket structure in which a protruding part functions as a central yoke. The protruding part can be easily fabricated by being pressed into a bracket using a press or deep drawing method, and a coil is fixed by a stable structure. There is an advantage of a low production cost.

11 Claims, 7 Drawing Sheets

(56) References Cited

U.S. PATENT DOCUMENTS

| | | | | |
|---|---|---|---|---|
| 8,872,394 B2* | 10/2014 | Shim | .................. | H02K 33/16 310/25 |
| 9,621,015 B2* | 4/2017 | Katada | .................. | H02K 33/00 |
| 9,906,113 B2* | 2/2018 | Iwaki | .................. | H02K 33/16 |
| 2005/0162105 A1* | 7/2005 | Yamasaki | ............. | B06B 1/0246 318/114 |
| 2013/0342034 A1* | 12/2013 | Moon | .................. | B06B 1/045 310/25 |
| 2014/0054983 A1* | 2/2014 | Moon | .................. | H02K 33/16 310/28 |
| 2016/0172950 A1* | 6/2016 | Shim | .................. | H02K 33/16 310/25 |

\* cited by examiner

LINEAR VIBRATION GENERATOR

CROSS REFERENCE TO RELATED APPLICATION

The present application claims the benefit of Korean Patent Application No. 10-2016-0090248, filed in the Korean Intellectual Property Office on Jul. 15, 2016, the entire content of which is incorporated herein by reference.

BACKGROUND OF THE INVENTION

1. Technical Field

The present invention relates to a linear vibration generator in which a coil and a yoke disposed within the linear vibration generator can be fixed using a simple structure and, more particularly, to a linear vibration generator capable of being easily fabricated at a cheap cost by forming a protruding part in the central part of a bracket so that the protruding part functions as a central yoke.

2. Description of Related Art

Recently, as the market of a mobile device is expanded, various technologies which may be implemented in the mobile device are developed. A haptic function applied to the mobile device is one of the technologies. Recently, the size of the entire device is reduced through the improvement of an internal structure, such as a reduction in the size of a vibration generation device that implements the haptic function and a reduction in the thickness thereof.

For example, a conventional technology, such as Patent Document 1, has adopted a configuration in which a yoke of a T shape is coupled to a bracket forming a vibration generation device in order to secure a sufficient vibration power and also to prevent the size of the vibration generation device from being excessively increased.

However, such a conventional technology has problems in that it requires an additional process for the bracket in order to connect the yoke to the bracket, a lot of man power and time are required because the yoke suitable for the condition of the bracket must be separately fabricated, and a production cost is increased because the number of parts forming the inside of the vibration generation device is increased.

Accordingly, there is a need for a technology capable of reducing the number of parts forming the inside of a vibration generation device, simplifying an assembly process, and reducing a production cost.

PRIOR ART DOCUMENT

[Patent Document]
(Patent Document 1) KR 1101330

SUMMARY OF THE INVENTION

Accordingly, the present invention has been made keeping in mind the above problems occurring in the prior art, and an object of the present invention is to provide a linear vibration generator, which has advantages of a simplified assembly process and a low production cost by reducing the number of parts that form the inside of the vibration generation device through the improved structure of a bracket that fixes a stator.

A linear vibration generator 1 according to an embodiment of the present invention includes a casing 2, a bracket 3 configured to have a protruding part 31 formed at the center of the bracket and coupled to the casing 2, the protruding part 31 being upward protruded and extended, a stator 4 coupled to the protruding part 31, an elastic body 5 configured to have one side fixed to the casing 2 or the bracket 3 and the other side fixed to a vibrator 7, and an FPCB 6 fixed to the bracket 3 to electrically connect an external device and a coil.

The stator 4 may include the coil 41 inserted into the protruding part 31 and disposed to be not higher than the height of the protruding part 31 and a yoke 42 disposed in one or more of the upper and lower sides of the coil 41.

The yoke 42 may be any one of a structure which has a doughnut shape and is inserted into the protruding part 31 and fixed to the protruding part 31, a structure which has a disc shape and is fixed to the protruding part 31 in a concentric axis with the circular top of the protruding part 31, and a structure which has a disc shape, in which a press-in groove 43 having the same diameter as the protruding part 31 is formed at the center of the yoke 42, and which is fixed to the protruding part 31 in a concentric axis with a circular top of the protruding part 31.

An electromagnetic force may be improved by inserting an iron core (shaft) of a magnetic substance into an empty space within the protruding part 31.

Furthermore, the elastic body 5 may be configured to have one side fixed to the casing 2 instead of the bracket 3 and the other side coupled to the vibrator 7.

The vibrator 7 may include a magnet 71, a weight body 72, a magnetic fluid (MF) coated on the magnet 71, and a lower yoke 74.

A circular magnetic fluid damper may be disposed on the magnet 71 by coating a magnetic fluid MF.

A film may be additionally disposed on the bottom of the casing 2 so that it faces the magnetic fluid damper.

The magnet 71 may be formed using one magnet or formed by combining an upper magnet 711 and a lower magnet 712.

The vibrator 7 may further include a central yoke 75 coupled between the upper magnet 711 and the lower magnet 712.

A damper 8 of a ring shape or disc shape may be coupled to the casing 2 or the bracket 3 to which the elastic body 5 is fixed.

DETAILED DESCRIPTION

Figure 1:
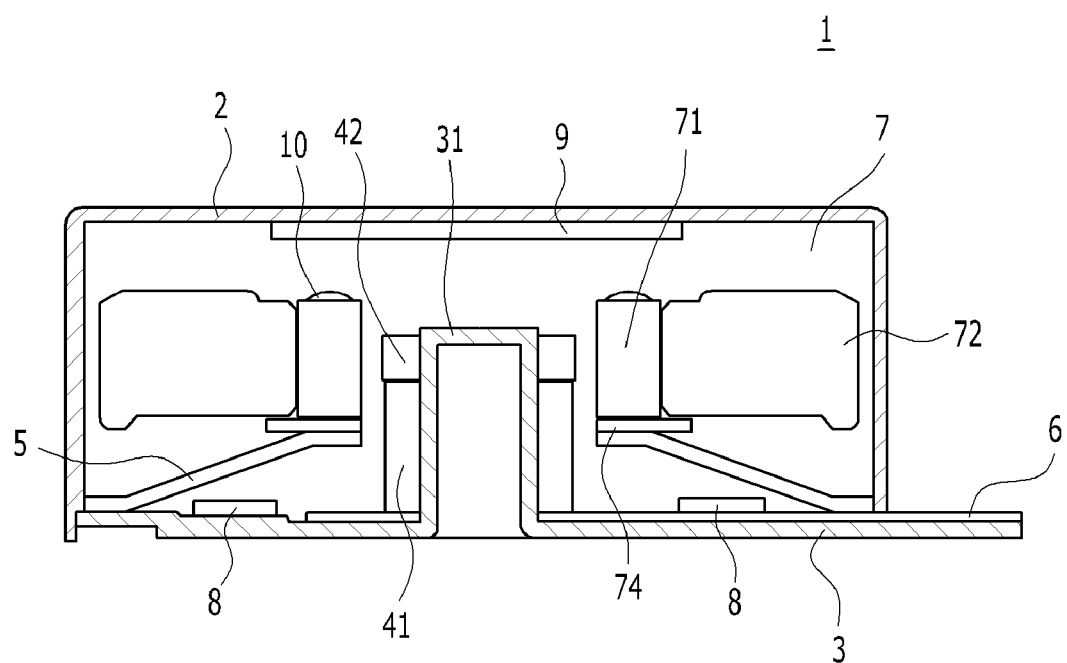
FIG. 1 is a cross-sectional view of a linear vibration generator according to an embodiment of the present invention and shows a case where a yoke has a doughnut shape.

Hereinafter, some embodiments of the present invention are described in detail with reference to illustrative drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of the present invention, terms, such as the first, the second, A, B, (a), and (b), may be used. However, although the terms are used only to distinguish one element from the other element, the essence, order, or sequence of the elements is not limited by the terms. When it is said that one element is "connected", "combined", or "coupled" to the other element, the one element may be directly connected or coupled" to the other element, but it should also be understood that a third element may be "connected", "combined", or "coupled" between the two elements.

FIG. 1 is a cross-sectional view of a linear vibration generator according to an embodiment of the present invention and shows a case where a yoke has a doughnut shape.

A basic structure of the linear vibration generator 1 according to an embodiment of the present invention is described in detail with reference to FIG. 1.

For reference, FIG. 1 shows only the half of the linear vibration generator 1 having a symmetrical structure. This is for clearly showing an internal structure of the linear vibration generator 1. Accordingly, it should be understood that the remaining half of the linear vibration generator 1 omitted in the drawing has been extended from the illustrated structure having a symmetrical form. It is to be noted that such a symmetrical form is omitted in other drawings in the same manner.

The configuration of the linear vibration generator 1 of FIG. 1 is described below. It may be seen that a casing 2 configured to perform a cover function on the upper side and a bracket 3 coupled to the bottom of the casing and configured to perform a function for supporting the linear vibration generator 1 are fixed to the linear vibration generator 1.

Specifically, it may be seen that the linear vibration generator 1 is shown which includes the casing 2, the bracket 3 coupled to the casing 2 and configured to include a protruding part 31 which is formed at the center of the bracket 3 and has an upward protruded shape, a stator 4 fixed to the protruding part 31, an elastic body 5 configured to have one side fixed to the bracket 3 and the other side fixed to a vibrator 7, and an FPCB 6 fixed to the bracket 3 to electrically connect an external device and a coil.

The linear vibration generator 1 may include the coil 41 inserted into the protruding part 31 and fixed thereto and disposed to be not higher than the protruded height of the protruding part 31 and a yoke 42 fixed to one or more of the upper side and lower side of the coil 41.

The protruding part 31 may be fabricated in such a way as to be pressed into an internal space formed by a combination of the bracket and the casing using a press or deep drawing. Accordingly, a structure for stably fixing the coil 41 by a single simple process can be obtained.

Furthermore, the protruding part 31 is a structure upward extended from the coil 41 within the internal space and can generate an electromagnetic field in a relation with the coil 41 without an essential and separate yoke assembly.

Accordingly, there are effects in that a product structure can be simplified, productivity can be improved and a manufacturing cost can be reduced by forming the structure for fixing the coil 41 through a single simple press process.

In this case, the coil 41 may be fixed to have a ring shape on the outside of the protruding part 31 of the bracket pressed-in in such a way as to comply with the size of the internal diameter of the coil, but may be attached and fixed by coating the outside of the protruding part 31 of the bracket with a separate adhesive material.

Figure 2:
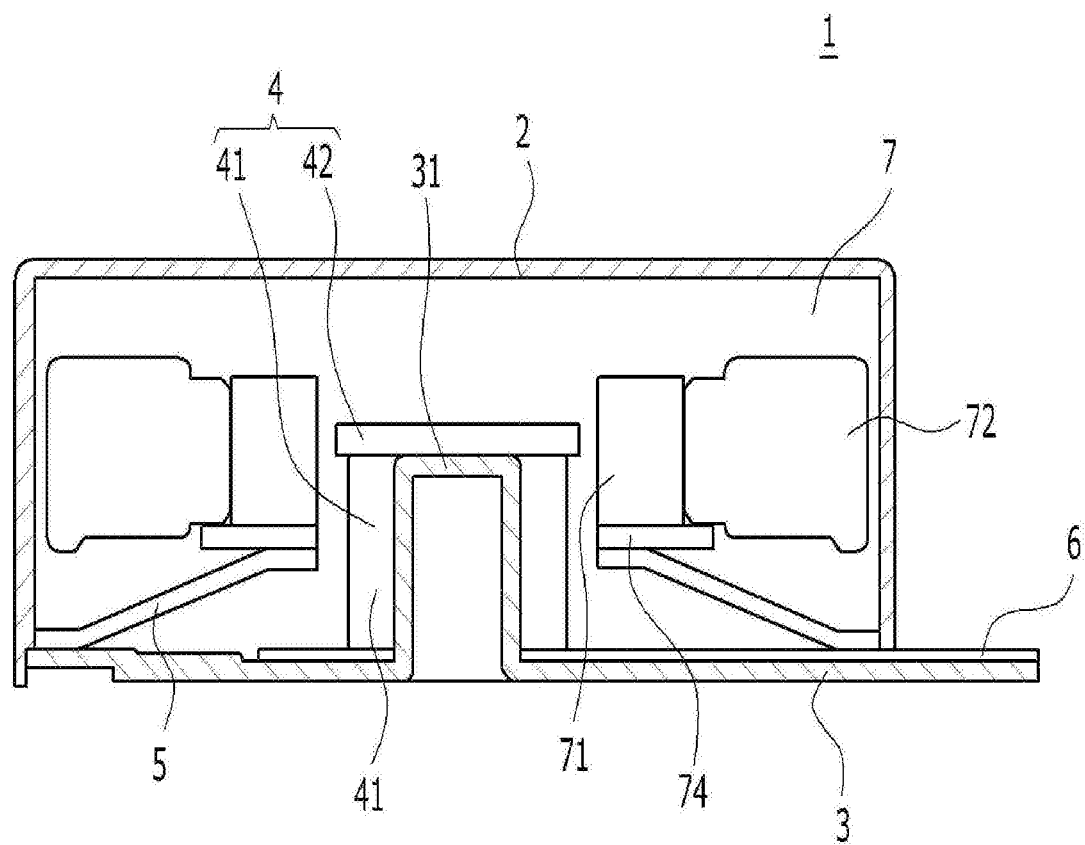
FIG. 2 is a cross-sectional view of a linear vibration generator according to an embodiment of the present invention and shows a case where a yoke has a disk shape.
Figure 3:
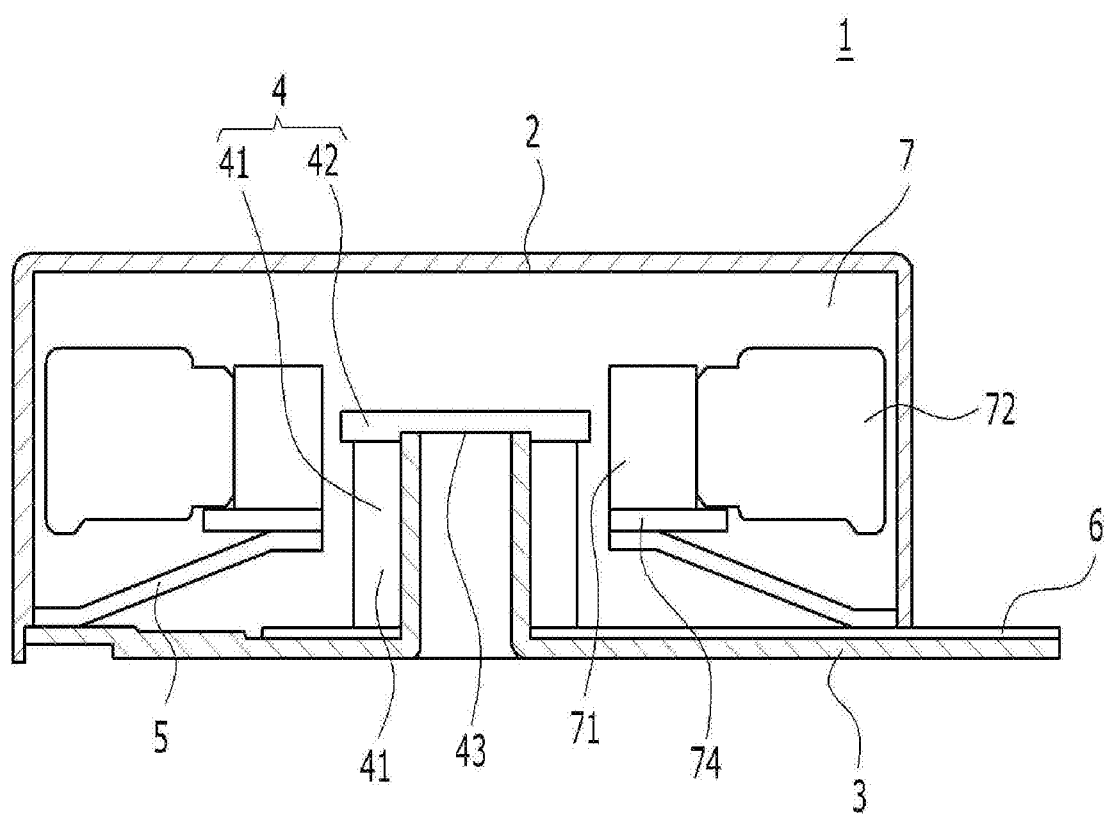
FIG. 3 is a cross-sectional view of a linear vibration generator according to an embodiment of the present invention and shows a case where a yoke has a doughnut shape having a press-in groove.

FIG. 2 is a cross-sectional view of a linear vibration generator according to an embodiment of the present invention and shows a case where a yoke has a disk shape, and FIG. 3 is a cross-sectional view of a linear vibration generator according to an embodiment of the present invention and shows a case where a yoke has a doughnut shape having a press-in groove.

The yoke 42 may have a doughnut shape and may be inserted into the protruding part 31 and fixed thereto (FIG. 1). The yoke 42 may have a disc shape and may be fixed to the protruding part 31 in the concentric axis with the circular top of the protruding part 31 (FIG. 2). The yoke 42 has a disc shape, but may have a press-in groove 43 of the same diameter as the protruding part formed at the center and may be fixed to the protruding part 31 by the structure fixed in the concentric axis with the circular top of the protruding part 31 (FIG. 3). Accordingly, there are advantages in that the coupling of the yoke for amplifying an electromagnetic force can be performed easily and rapidly without a separate processing process and the coupling of the yoke 42 and the coil 41 can also be effectively performed.

Figure 4:
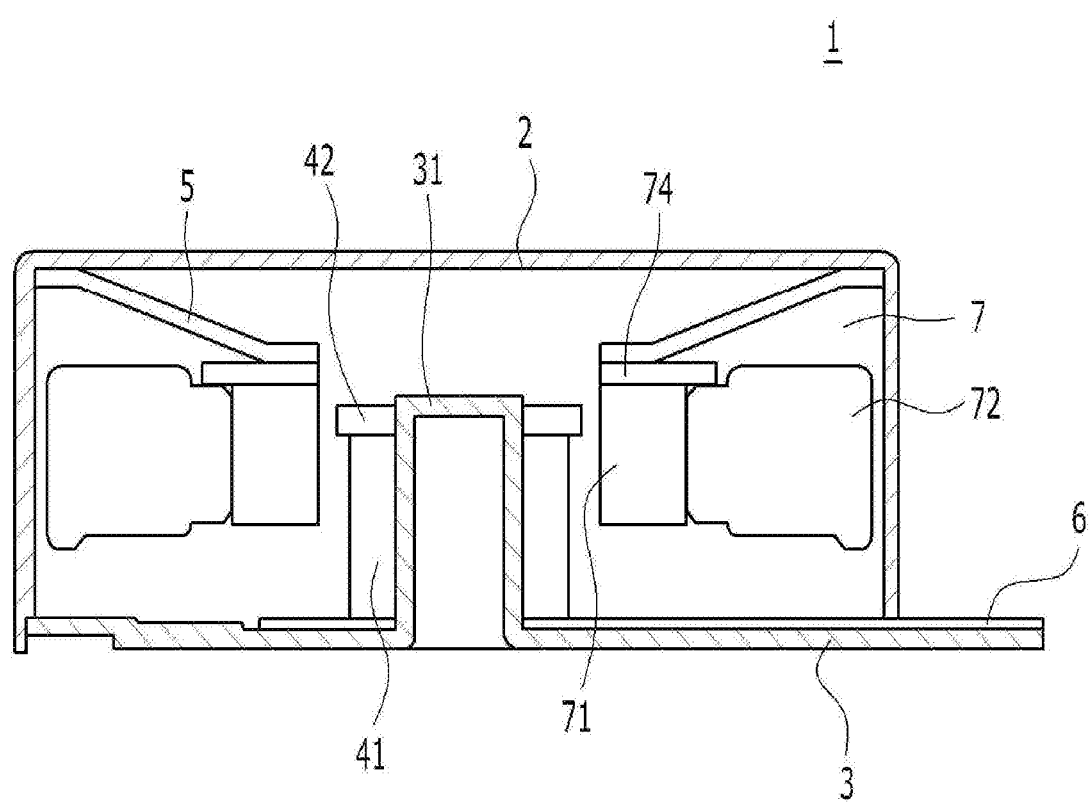
FIG. 4 is a cross-sectional view showing a case where an elastic body has been attached to an upper casing in the linear vibration generator of FIG. 1.

FIG. 4 is a cross-sectional view showing a case where an elastic body has been attached to an upper casing in the linear vibration generator of FIG. 1.

The elastic body 5 does not need to be essentially fixed to one surface on the top of the bracket 3 and may be attached to one surface on the inside of the casing 2, if necessary.

Additionally, the structure of the vibrator 7 and magnet 71 of the linear vibration generator 1 are described in detail below.

Figure 5:
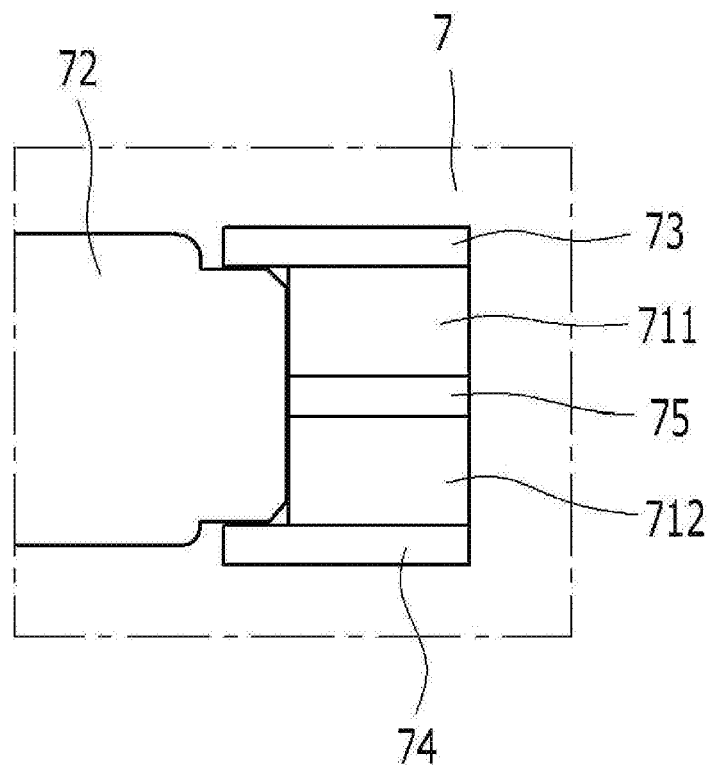
FIG. 5 is an enlarged cross-sectional view of a vibrator according to an embodiment of the present invention.

FIG. 5 is an enlarged cross-sectional view of the vibrator according to an embodiment of the present invention.

The vibrator 7 includes a magnet 71 of a ring shape, a weight body 72 of a ring shape coupled to the lateral surface of the magnet, and a lower yoke 74 coupled to the bottom of the magnet.

Specifically, the weight body 72 functions to increase a vibration power according to the up/down movement of the vibrator 7. Yokes 73 and 74 coupled to the magnet 71 function to increase an electromagnetic force.

In this case, the magnet 71 may include one magnet or may have a combination of an upper magnet 711 and a lower magnet 712.

When the two or more magnets 711 and 712 are combined to form the magnet 71, they can generate a stronger electromagnetic force.

The vibrator 7 may further include a central yoke 75 coupled between the upper magnet 711 and the lower magnet 712.

The yokes 73, 74 and 75 may be made of a magnetic substance, a weak magnetic substance or a non-magnetic substance.

Figure 6:
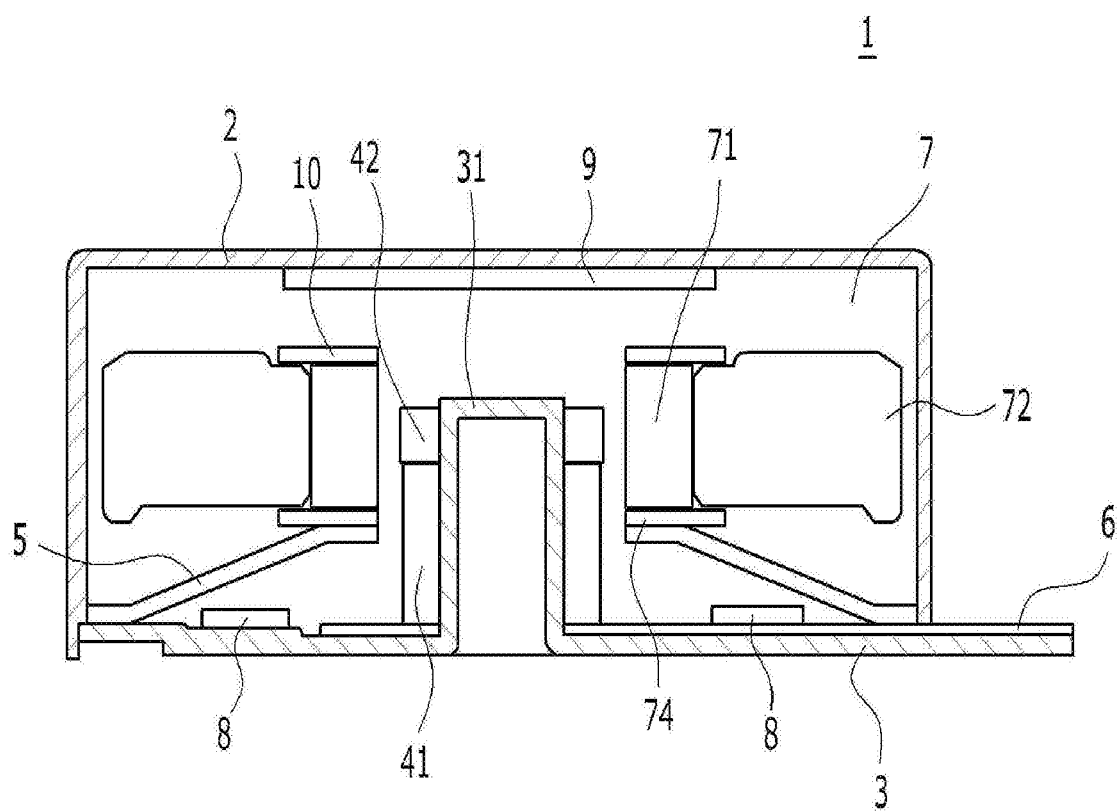
FIG. 6 is a cross-sectional view of a linear vibration generator including a damper of a ring shape according to an embodiment of the present invention.

FIG. 6 is a cross-sectional view of a linear vibration generator including a damper of a ring shape according to an embodiment of the present invention.

A damper 8 of a ring shape or disc shape may be fixed to one surface on the inside of the casing 2 or one surface on the top of the bracket 3 to which the elastic body 5 is fixed.

If such a configuration to which the damper 8 is fixed is adopted, the vibrator 7 or the elastic body 5 can be prevented from being damaged by a shock attributable to a strong vibration power or a shock attributable to the dropping of an electronic device.

Figure 7:
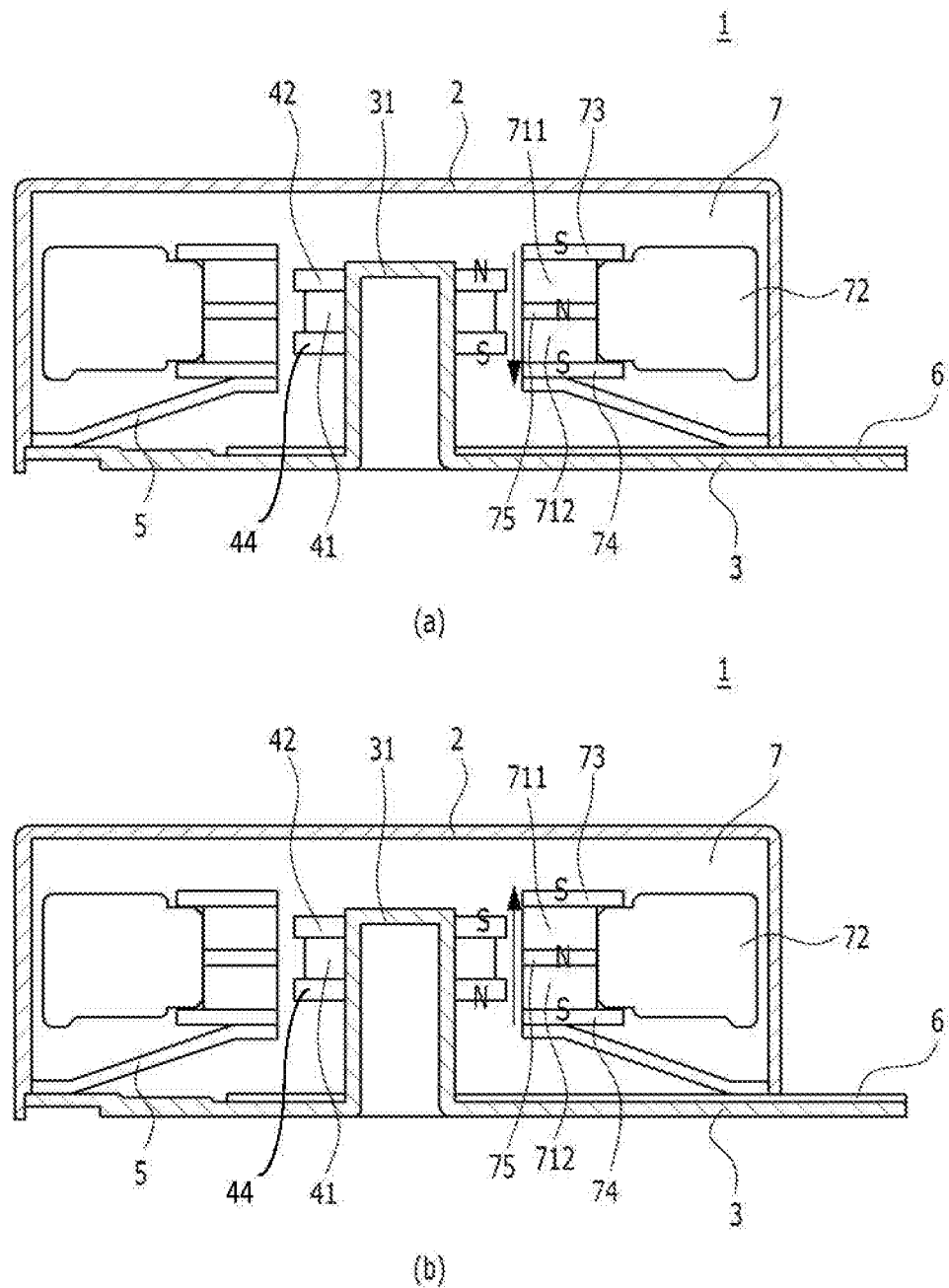
FIG. 7 is a cross-sectional view of a linear vibration generator, including a casing, the protruding part of a bracket, and yokes fixed to the upper and lower sides of a coil according to an embodiment of the present invention.

FIG. 7 is a cross-sectional view of the linear vibration generator, including the casing, the protruding part of the bracket, and the yokes fixed to the upper and lower sides of the coil according to an embodiment of the present invention.

In FIG. 7, (a) shows a movement of the vibrator 7 when current flowing into the coil 41 is a counterclockwise direction, and (b) shows a movement of the vibrator 7 when current flowing into the coil 41 is a clockwise direction.

In general, the coil 41 surrounds the outside of the protruding part 31 and falls down up to the bottom of the bracket 3 and is located thereon, and only one yoke is disposed on top of the coil. In the structure in which two or more magnets 71 are disposed, as shown in FIG. 7, for example, the coil 41 may be spaced apart from the bottom of the bracket and disposed in the protruding part 31 and yokes 42 and 44; may be disposed on the top and bottom of the coil 41, respectively.

If the magnet 71 including two or more magnets 711 and 712 up and down is disposed as in FIG. 7, the two yokes 42 and 44; on the coil side that face the magnet 71 applies an electromagnetic force, which is about twice compared to a case where one yoke is provided, to the magnet 71. Specifically, when the current of the coil is changed as in FIG. 7, a force is generated from the two yokes 42 and 44; on the coil side. Accordingly, a greater force can be transferred to the magnet 71. Furthermore, there is an advantage in that a displacement of the vibrator can be limited further easily because the two yokes are configured on the top and bottom of the coil and an up and down influence is applied to the magnet 71.

Referring to (a) of FIG. 7, when a current flowing into the coil 41 is a counterclockwise direction, the direction of a magnetic field generated by the coil 41 is downward, and thus an N pole and an S pole are formed in the upper yoke 42 and lower yoke 44; of the coil 41, respectively. In (b) of FIG. 7, the direction of the magnetic field is opposite because the direction of current is opposite.

In a conventional structure, when a displacement of the magnet is maximized at a resonant point, there is a problem in that the magnet collides against the casing or the bracket because it is difficult to limit the displacement.

For this reason, a structure in which a shock is absorbed by inserting a magnetic fluid (MF) into the magnet or a displacement is limited and a shock is absorbed by attaching a cushion to the magnet.

If the structure including the upper and lower yokes 42 and 44 on the protruding part side and the structure including the magnet 71 having two or more magnets on the vibrator side are adopted as in an embodiment of the present invention, however, a displacement can be limited from a point where the N pole precisely meets the S pole in each of the structures. That is, as shown in (a) of FIG. 7, the vibrator 7 is moved upward due to attraction and repulsion between the yokes 42 and 44 of the coil 41 and the yokes 73, 74 and 75 of the vibrator 7. When the vibrator 7 moves upward and thus the yokes of the coil 41 become parallel to the yokes of the vibrator 7, the movement of the vibrator 7 is stopped because a magnetically stabilized location has been reached. Accordingly, the magnet 71 can be prevented from colliding against the casing 2 or the bracket 3.

Although the vibrator 7 moves downward as (b) of FIG. 7, a displacement can be restricted by a magnetic force between the yokes 42 and 44 of the coil 41 and the yokes 73, 74 and 75 of the vibrator 7.

Furthermore, the present invention has an advantage in that it can prevent the leakage of magnetic flux to the outside of the linear vibration generator.

A magnetic closed circuit is formed from the magnet 71 to the yoke 42 on the coil side, the protruding part 31, the yoke 42 on the coil side, and the magnet 71. Accordingly, the negative influence of magnetic flux that leak to surrounding elements can be reduced because the leakage of magnetic flux to the outside of the linear vibration generator is reduced.

The protruding part according to an embodiment of the present invention has advantages in that it can be easily fabricated in such a way as to be pressed into the bracket using a press or deep drawing method, can fix the coil (or stator) through a stable structure, and has a low production cost.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technological spirit of the present invention, but should be construed as illustrating the technological spirit of the present invention. The scope of the technological spirit of the present invention is not restricted by the embodiments, and the range of protection of the present invention should be interpreted based on the following appended claims. Accordingly, the present invention should be construed as covering all modifications or variations derived from the meaning and scope of the appended claims and their equivalents.

What is claimed is:

1. A linear vibration generator (1) comprising:
   a casing (2);
   a bracket (3) configured to be coupled to the casing (2) and to have a protruding part (31) formed at a center of the bracket (3) with an inside of the protruding part (31) being empty, the protruding part (31) being upwardly protruded by being extended from the center of the bracket (3) without reaching the casing (2);
   a stator (4) coupled to the protruding part (31);
   an elastic body (5) configured to have one side fixed to the casing (2) or the bracket (3) and the other side fixed to a vibrator (7); and
   an FPCB (6) fixed to the bracket (3) to electrically connect an external device and a coil.

2. The linear vibration generator of claim 1, wherein the stator (4) comprises:
   the coil (41) inserted into the protruding part (31) and disposed to be not higher than a height of the protruding part (31); and
   yokes (42) and (44) disposed in upper and lower sides of the coil (41).

3. The linear vibration generator of claim 2, wherein the yokes (42) and (44) each have a doughnut shape and are inserted into the protruding part (31) and fixed to the protruding part (31).

4. The linear vibration generator of claim 2, wherein the yoke (42) has a disc shape and is fixed to the protruding part (31) in a concentric axis with a circular top of the protruding part (31).

5. The linear vibration generator of claim 2, wherein:
the yoke (42) has a disc shape,
a press-in groove (43) having a diameter identical with a diameter of the protruding part (31) is formed at the center of the yoke (42), and
the yoke (42) is fixed to the protruding part (31) in a concentric axis with a circular top of the protruding part (31).

6. The linear vibration generator of claim 1, wherein the vibrator (7) comprises:
a magnet (71);
a weight body (72); and
one or more yokes (73) and (74) disposed in one or more of top and bottom of the magnet (71).

7. The linear vibration generator of claim 6, wherein the magnet (71) is formed by combining an upper magnet (711) and a lower magnet (712).

8. The linear vibration generator of claim 7, wherein the vibrator (7) further comprises a central yoke (75) coupled between the upper magnet (711) and the lower magnet (712).

9. The linear vibration generator of claim 1, wherein a damper (8) of a ring shape or disc shape is fixed to the casing (2) or the bracket (3) to which the elastic body (5) is fixed.

10. The linear vibration generator of claim 1, wherein an iron core of a magnetic substance is inserted into an internal space of the protruding part (31).

11. The linear vibration generator of claim 6, wherein the vibrator (7) further comprises a magnetic fluid coated on a top of the magnet (71).

* * * * *